United States Patent
Shin

(10) Patent No.: US 8,412,003 B2
(45) Date of Patent: Apr. 2, 2013

(54) IMAGE PROCESSING METHODS, APPARATUS AND COMPUTER PROGRAM PRODUCTS USING INTERDEPENDENT PIXEL INTERPOLATION OPERATIONS

(75) Inventor: Hoseok Shin, Seoul (KR)

(73) Assignee: Samsung Electronics Co., Ltd. (KR)

( * ) Notice: Subject to any disclaimer, the term of this patent is extended or adjusted under 35 U.S.C. 154(b) by 585 days.

(21) Appl. No.: 12/690,249

(22) Filed: Jan. 20, 2010

(65) Prior Publication Data
US 2010/0201869 A1    Aug. 12, 2010

(30) Foreign Application Priority Data
Feb. 12, 2009  (KR) ......................... 10-2009-0011529

(51) Int. Cl.
*G06K 9/32* (2006.01)
*G06K 9/40* (2006.01)
(52) U.S. Cl. ........................ 382/300; 382/254
(58) Field of Classification Search .................. None
See application file for complete search history.

(56) References Cited

U.S. PATENT DOCUMENTS

| | | | | |
|---|---|---|---|---|
| 5,054,100 A | * | 10/1991 | Tai ................................ | 382/300 |
| 5,266,805 A | * | 11/1993 | Edgar ........................... | 250/330 |
| 5,347,599 A | * | 9/1994 | Yamashita et al. ............ | 382/278 |
| 5,550,936 A | * | 8/1996 | Someya et al. ................ | 382/263 |
| 5,602,654 A | * | 2/1997 | Patti et al. ..................... | 358/461 |
| 5,737,101 A | * | 4/1998 | Ito .................................. | 358/525 |
| 5,774,601 A | * | 6/1998 | Mahmoodi .................... | 382/298 |
| 5,793,379 A | * | 8/1998 | Lapidous ....................... | 345/606 |
| 5,832,143 A | * | 11/1998 | Suga et al. .................... | 382/300 |
| 5,875,268 A | * | 2/1999 | Miyake ......................... | 382/276 |
| 5,878,159 A | * | 3/1999 | Taleblou et al. .............. | 382/128 |
| 5,911,007 A | * | 6/1999 | Miyake ......................... | 382/233 |

FOREIGN PATENT DOCUMENTS

| | | |
|---|---|---|
| JP | 2006-135825 | 5/2006 |
| JP | 2008-135851 | 6/2008 |
| KR | 1020010075103 A | 8/2001 |
| KR | 1020070031805 A | 3/2007 |

* cited by examiner

*Primary Examiner* — Manav Seth
(74) *Attorney, Agent, or Firm* — Myers Bigel Sibley & Sajovec, P.A.

(57) ABSTRACT

Image processing includes generating image data for an image, the image data including an array of original pixels. Respective first pixels for the image are interpolated from respective pluralities of original pixels adjacent the interpolated first pixels. Respective second pixels for the image are interpolated from respective pluralities of original pixels adjacent the interpolated second pixels using image information generated in the interpolation of the interpolated first pixels.

11 Claims, 15 Drawing Sheets

IMAGE PROCESSING METHODS, APPARATUS AND COMPUTER PROGRAM PRODUCTS USING INTERDEPENDENT PIXEL INTERPOLATION OPERATIONS

CROSS-REFERENCE TO RELATED APPLICATIONS

This U.S. non-provisional patent application claims priority under 35 U.S.C. §119 of Korean Patent Application No. 10-2009-0011529, filed on Feb. 12, 2009, the entire contents of which are hereby incorporated by reference.

BACKGROUND

The present disclosure herein relates to image processing methods, apparatus and computer program products and, more particularly, to image processing methods, apparatus and computer program products involving pixel interpolation.

The image quality of a digital camera is generally dependent on the resolution of an image sensor (i.e., the number of pixels). In comparison to a low-resolution image sensor, a high-resolution image sensor represents the same image using more pixels, thus potentially providing a higher quality output.

However, the higher quality may require increased product cost. Techniques for converting low-resolution images into higher resolution images have been developed, which may provide higher quality while maintaining lower costs. In some conventional resolution expansion processes, however, image quality degradation may occur due to aliasing ("jagging"), blurring, ringing, and definition degradation.

SUMMARY

Embodiments of the inventive subject matter provide methods, apparatus and computer program products using interpolation techniques that can reduce aliasing.

Some embodiments provide image processing methods including generating image data for an image, the image data including an array of original pixels. Respective first pixels for the image are interpolated from respective pluralities of original pixels adjacent the interpolated first pixels. Respective second pixels for the image are interpolated from respective pluralities of original pixels adjacent the interpolated second pixels using image information generated in the interpolation of the interpolated first pixels.

In some embodiments, interpolating the respective first pixels includes detecting an edge from the original pixels adjacent the first interpolated pixel, generating a directional interpolation coefficient responsive to detection of the edge, generating a directional interpolation value from the directional interpolation coefficient, linearly interpolating a value from the adjacent original pixels, calculating a spatial frequency of the adjacent original pixel and combining the directional interpolation value and the linearly interpolated value based on the calculated spatial frequency to generate an interpolated first pixel. Linearly interpolating a value from the adjacent original pixels may include, for example, bi-linear and/or bi-cubic interpolation.

Combining the directional interpolation value and the linearly interpolated value may include determining a weight value of the directional interpolation value according to the calculated spatial frequency and combining the directional interpolation value and the linearly interpolated value based on the determined weight value to generate a first interpolated pixel. Determining a weight value may include assigning a first weight value to the directional interpolation value if the calculated spatial frequency is greater than a predetermined value or assigning a second weight value less than the first weight value to the directional interpolation value if the calculated spatial frequency is less than the predetermined value. Generating a directional interpolation coefficient may include calculating a luminance value from the adjacent original pixels, calculating a direction based on the calculated luminance value and generating the directional interpolation coefficient based on the calculated direction.

According to some embodiments, interpolating respective second pixels includes interpolating the second pixels after interpolating first pixels for the entire image. In further embodiments, interpolating respective second pixels includes interpolating the second pixels from adjacent original pixels and the interpolated first pixels. In still further embodiments, interpolating respective second pixels includes interpolating the second pixels from adjacent original pixels and luminance information generated in interpolating the first pixels.

The present invention may be embodied as apparatus, methods and computer program products.

BRIEF DESCRIPTION OF THE DRAWINGS

The accompanying drawings are included to provide a further understanding of the inventive subject matter, and are incorporated in and constitute a part of this specification. The drawings illustrate exemplary embodiments of the inventive subject matter and, together with the description, serve to explain principles of the inventive subject matter. In the drawings.

DETAILED DESCRIPTION

Figure 1:
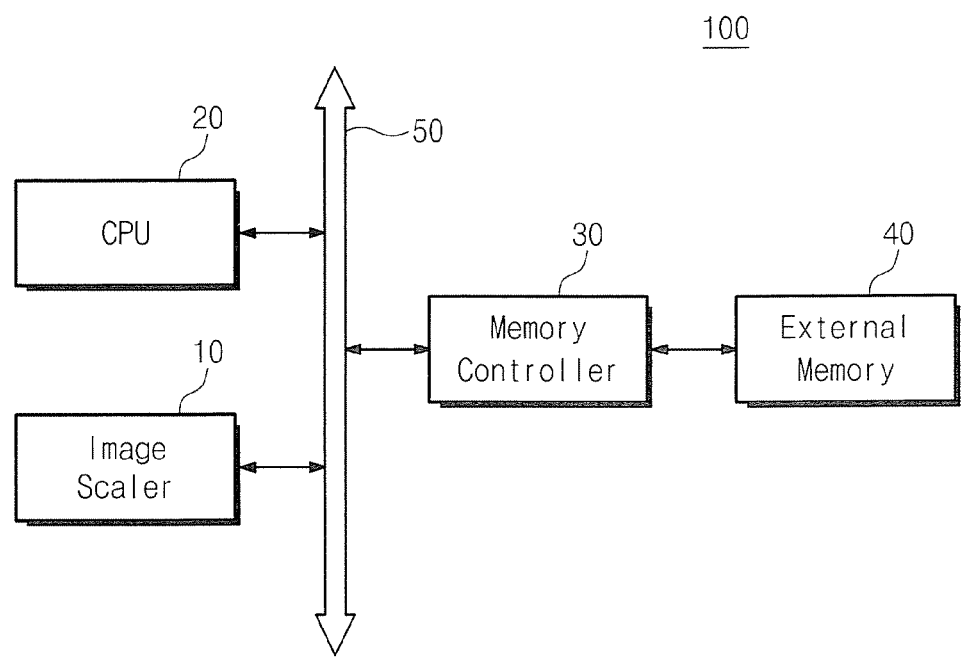
FIG. 1 is a diagram of an image processing system according to some embodiments of the inventive subject matter.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, apparatus, and/or computer program products. Accordingly, the present invention may be embodied in hardware and/or in software (including firmware, resident software, micro-code, etc.). Furthermore, the present invention may take the form of a computer program product including a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Embodiments are described hereinafter with reference to flowchart and/or block diagram illustrations. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

FIG. 1 is a diagram of an image processing system 100 according to some embodiments of the inventive subject matter. The image processing system 100 includes an image scaler 10, a central processing circuit (CPU) 20, a memory controller 30, an external memory 40 and a system bus 50.

The image scaler 10 changes the resolution of an input image received from an external device. The image scaler 10 will be described later in detail with reference to FIGS. 2 and 3. The CPU 20 may be, for example, an ARM® processor. The memory controller 30 accesses the external memory 40 in response to a control signal of the CPU 20. For example, the external memory 40 may be a DRAM. The system bus 50 connects the image scaler 10, the CPU 20, and the memory controller 30.

Figure 2:
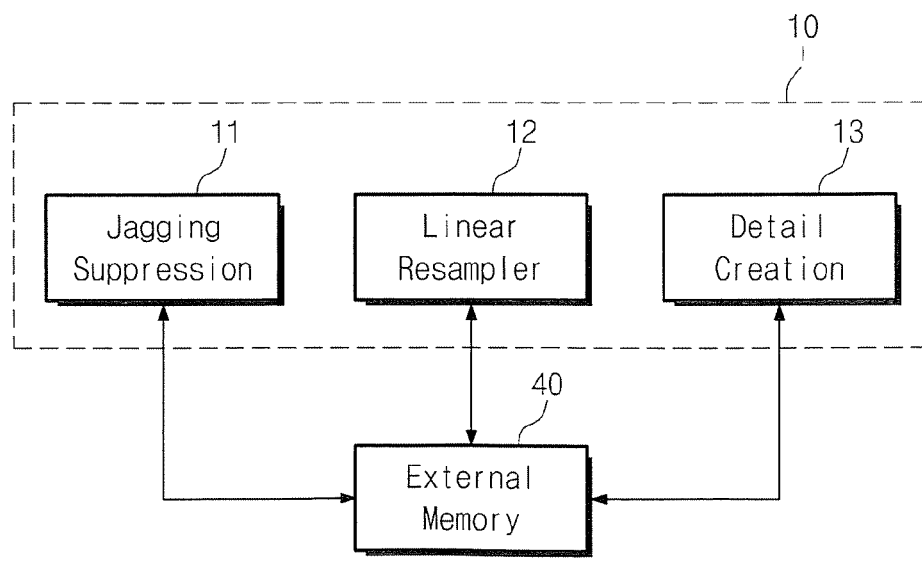
FIG. 2 is a block diagram of an implementation of an image scaler circuit of FIG. 1.

FIG. 2 is a block diagram of an implementation of the image scaler 10 illustrated in FIG. 1. Referring to FIGS. 1 and 2, the image scaler 10 includes a jagging suppression circuit 11, a linear resampler circuit, and a detail creation circuit 13.

The jagging suppression circuit 11 suppresses an aliasing of an input image and stores the result in the external memory 40. The linear resampler circuit 12 changes the resolution of an image stored in the external memory 40 and stores the result in the external memory 40. In particular, the linear resampler circuit 12 increases or decreases the resolution of an image stored in the external memory 40. The detail creation circuit 13 increases the definition of an image stored in the external memory 40. An implementation of the jagging suppression circuit 11 will be described later in detail with reference to FIG. 3.

Figure 3:
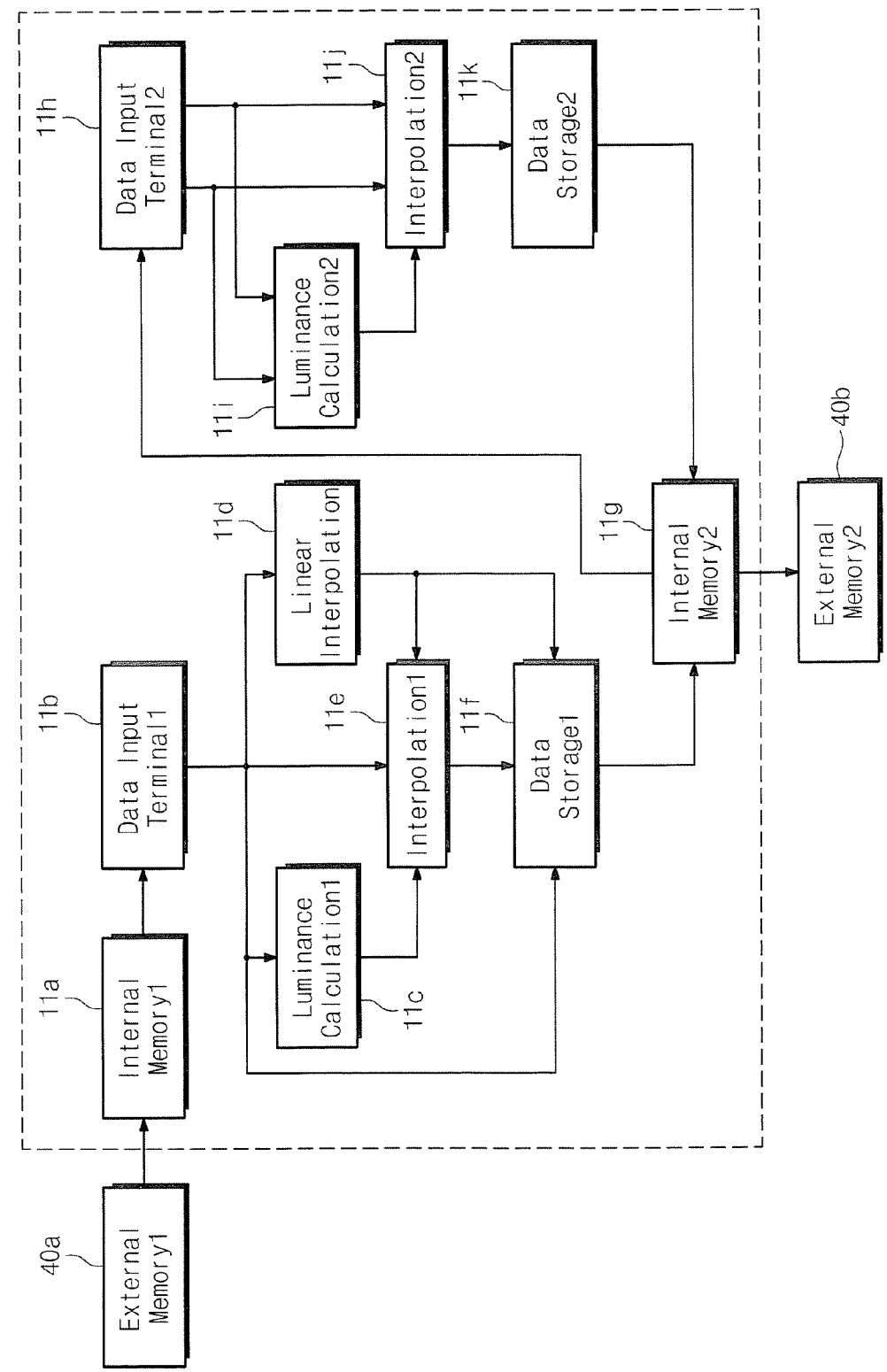
FIG. 3 is a block diagram of an implementation of a jagging suppression circuit of FIG. 2.

FIG. 3 is a block diagram of an implementation of the jagging suppression circuit 11 illustrated in FIG. 2. Referring to FIGS. 2 and 3, the jagging suppression circuit 11 includes a first internal memory 11a, a first data input terminal 11b, a first luminance calculation circuit 11c, a linear interpolation circuit 11d, a first interpolation circuit 11e, a first data storage circuit 11f, a second internal memory 11g, a second data input terminal 11h, a second luminance calculation circuit 11i, a second interpolation circuit 11j, and a second data storage circuit 11k.

A first interpolation process is performed by the first data input terminal 11b, the first luminance calculation circuit 11c, the first interpolation circuit 11e, and the first data storage circuit 11f. A second interpolation process is performed by the second data input terminal 11h, the second luminance calculation circuit 11i, and the second interpolation circuit 11j.

The second interpolation process is performed upon completion of the first interpolation process. The first interpolation process will be described later in detail with reference to FIGS. 4 to 8, and the second interpolation process will be described later in detail with reference to FIGS. 5 to 10. Also, a jagging suppression operation according to some embodiments of the inventive subject matter will be described later in detail with reference to FIGS. 4 to 10.

The external memory 40 includes a first external memory 40a and a second external memory 40b. In some embodiments, the first external memory 40a stores an image with an original resolution, and the second external memory 40b stores an image with a resolution scaled up by a factor of 2×2 in comparison with the original resolution.

For example, the first external memory 40a may store 5 megapixels (i.e., 5 million pixels), that is, the first external memory 40a may store 2592×1944×24 bits. Image data stored in the first internal memory 11a may comprise 2592× 1944 pixels.

The image data stored in the first internal memory 11a comprises original pixels before resolution scaling-up. Each of the original pixels may include, for example, 24 bits, e.g., 8 bits for Red, 8 bits for Green, and 8 bits for Blue.

A first pixel interpolation process according to some embodiments of the inventive subject matter will now be described. The first internal memory 11a may store, for example, 7 lines (i.e., 2592×7 pixels) among image data received from the first external memory 40a. The first data input terminal 11b reads 1176 (=7×7×24) bits from the first internal memory 11a and transmits the same to the first luminance calculation circuit 11c, the linear interpolation circuit 11d, the first interpolation circuit 11e, and the first data storage circuit 11f.

The first luminance calculation circuit 11c calculates the luminance of an original pixel received from the first data input terminal 11b. The linear interpolation circuit 11d calculates a linear interpolated value of an original pixel received from the first data input terminal 11b. Operations for calculating the value will be described later in detail with reference to FIG. 8.

The first interpolation circuit 11e receives the calculated luminance value from the first luminance calculation circuit 11c and the linearly interpolated value from the linear interpolation circuit 11d to generate a first interpolated pixel.

Figure 4:
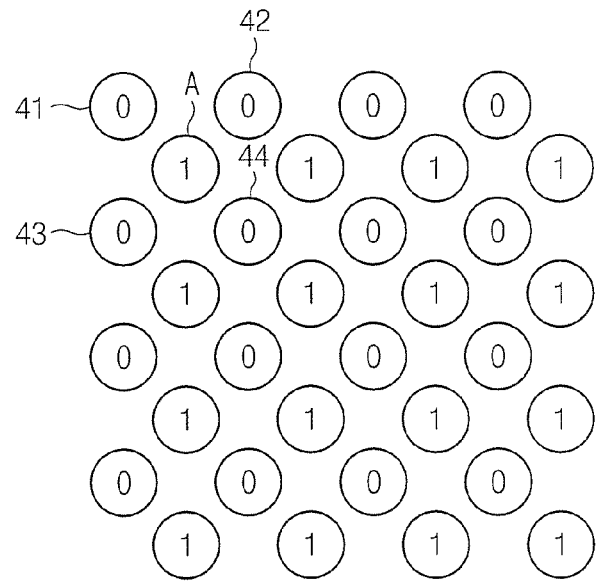
FIG. 4 is a diagram illustrating interpolation of a first pixel according to some embodiments of the inventive subject matter.

A process of generating the first interpolated pixel by the first interpolation circuit 11e will be described later in detail with reference to FIGS. 6 to 8. The first data storage circuit 11f stores the original pixel, the linearly interpolated value generated by the linear interpolation circuit 11d, and the first interpolated pixel generated by the first interpolation circuit 11e. The second internal memory 11g stores the original pixel, the linearly interpolated value, and the first interpolated pixel received from the first data storage circuit 11f. The first interpolation circuit 11e repeats the above first interpolation process until first interpolated pixels of FIG. 4 are all generated.

A second pixel interpolation process according to some embodiments of the inventive subject matter will now be described. The second data input terminal 11h receives the linearly interpolated value and the original pixel transmitted by the second internal memory 11g, and the first interpolated pixel generated by the first interpolation circuit 11e. The second luminance calculation circuit 11i calculates the luminance values of the first interpolated pixel and the original pixel received from the first data input terminal 11b. The second interpolation circuit 11j receives the first interpolated pixel, the linearly interpolated value, and the calculated luminance value from the second luminance calculation circuit 11i to generate a second interpolated pixel.

Figure 5:
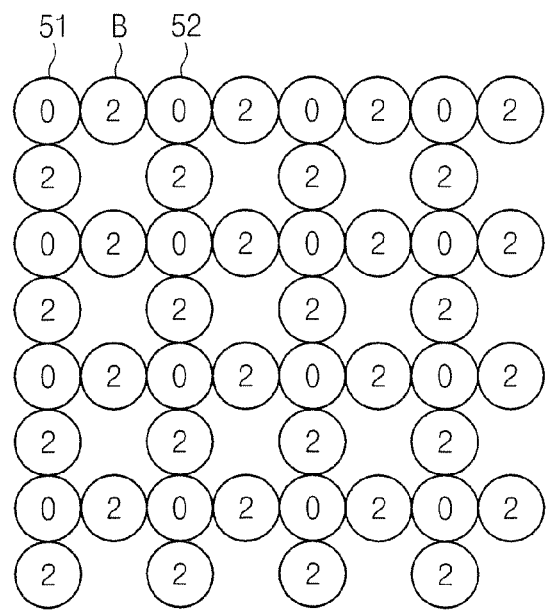
FIG. 5 is a diagram illustrating interpolation of a second pixel according to some embodiments of the inventive subject matter.

Operations for generating the second interpolated pixel by the second interpolation circuit 11j will be described later in detail with reference to FIGS. 9 and 10. The second data storage circuit 11k stores the second interpolated pixel generated by the second interpolation circuit 11j. The second internal memory 11g stores the second interpolated pixel received from the second data storage circuit 11k. The second interpolation circuit 11j repeats the above second interpolation process until second interpolated pixels of FIG. 5 are all generated.

Image aliasing may occur when the resolution of an image is scaled up. Image aliasing may be reduced by harmonizing interpolated pixels generated between the original pixels with the surrounding original pixels.

In some embodiments, a pixel interpolation process includes a first interpolation process and a second interpolation process. The first interpolation process generates first interpolated pixels located in a diagonal direction of the original pixels. The second interpolation process generates second interpolated pixels located in a widthwise or lengthwise direction of the original pixels. The first and second interpolation processes will be described later in detail with reference to FIGS. 4 to 10.

An interpolation process according to some embodiments of the inventive subject matter performs a second interpolation process after completion of a first interpolation process. The interpolation process according to some embodiments of the inventive subject matter will be described later in detail with reference to FIGS. 3 to 10.

An interpolation process according to further embodiments of the inventive subject matter performs a first interpolation process and a second interpolation process simultaneously. That is, the interpolation process according to further embodiments of the inventive subject matter performs a first interpolation process and a second interpolation process in a pipelined manner. The interpolation process according to further embodiments of the inventive subject matter will be described later in detail with reference to FIGS. 11 to 17.

FIG. 4 is a diagram illustrating generation of a first interpolated pixel according to some embodiments of the inventive subject matter. Referring to FIGS. 3 and 4, an image input from the first internal memory 11a includes original pixels. The original pixel is denoted by '0'. A first interpolated pixel according to some embodiments of the inventive subject matter is denoted by '1'.

The first interpolation process generates first interpolated pixels 1 in an image including original pixels 0. That is, the first interpolation process generates first interpolated pixels located in a diagonal direction of the original pixels 0. For example, the first interpolated pixel A is generated using the original pixels 41~44 surrounding the first interpolated pixel A. The first interpolation process will be described later in detail with reference to FIGS. 6 to 8.

FIG. 5 is a diagram illustrating generation of a second interpolated pixel according to some embodiments of the inventive subject matter. Referring to FIGS. 3 to 5, an image input from the first internal memory 11a includes original pixels. The original pixel is denoted by '0'. A second interpolated pixel according to some embodiments of the inventive subject matter is denoted by '2'.

The second interpolation process generates second interpolated pixels 2 in an image including original pixels 0. In particular, the second interpolation process generates second interpolated pixels located in a widthwise or lengthwise direction of the original pixels 0. For example, the second interpolated pixel B is generated using the original pixels 51~52 surrounding the second interpolated pixel B. The second interpolation process will be described later in detail with reference to FIGS. 9 and 10.

Figure 6:
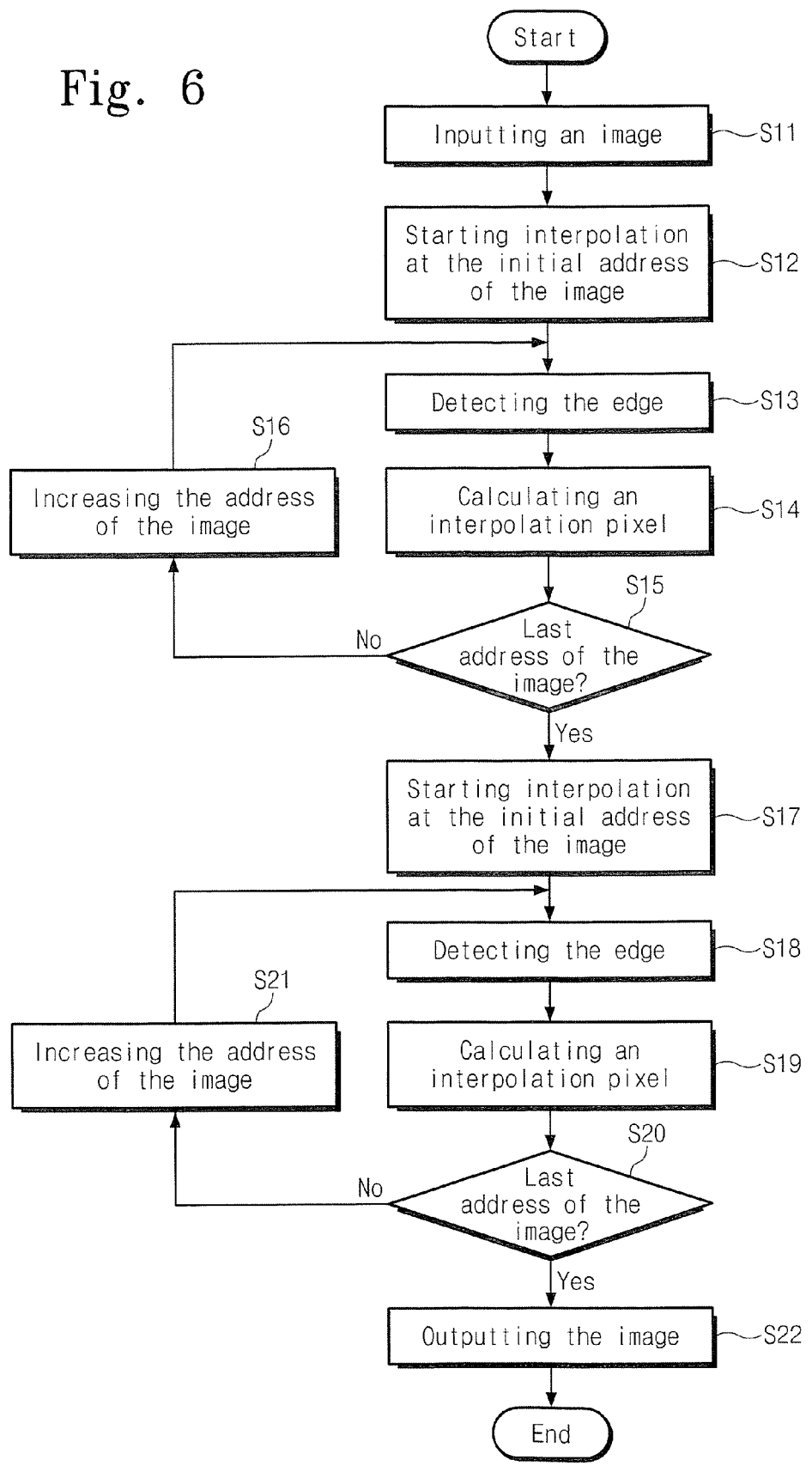
FIG. 6 is a flow chart illustrating an interpolation operations according to some embodiments of the inventive subject matter.

FIG. 6 is a flow chart illustrating interpolation operations according to some embodiments of the inventive subject matter. The interpolation operations include an initialization process (S11~S12), a first interpolation process (S13~S16), a second interpolation process (S17~S21), and an output process (S22).

The initialization process includes an operation S11 of receiving image data and an operation S12 of starting interpolation at the initial address of the image data. The first interpolation process generates the first interpolated pixel of FIG. 4. The first interpolation process includes an operation S13 of detecting an edge to determine an edge distribution, an operation S14 of calculating an interpolated pixel, an operation S15 of determining whether the current address is equal to the last address of the image data, and an operation S16 of increasing the address of the image data if the current address is not equal to the last address of the image data. Herein, if the current address is equal to the last address of the image data, the interpolation operations proceed to the next operation (S17). The operation S13 of detecting the edge in the first interpolation process will be described later in detail with reference to FIG. 7. The operation S14 of calculating the interpolated pixel in the first interpolation process will be described later in detail with reference to FIG. 8.

The second interpolation process generates the second interpolated pixel of FIG. 5. The second interpolation process includes an operation S17 of starting interpolation at the initial address of image data, an operation S18 of detecting an edge to determine an edge distribution, an operation S19 of calculating an interpolated pixel, an operation S20 of determining whether the current address is equal to the last address of the image data, and an operation S21 of increasing the address of the image data if the current address is not equal to the last address of the image data. Herein, if the current address is equal to the last address of the image data, the interpolation operations proceed to the next operation (S22). The operation S18 of detecting the edge in the second interpolation process will be described later in detail with reference to FIG. 9. The operation S19 of calculating the interpolated pixel in the second interpolation process will be described later in detail with reference to FIG. 10.

The output process includes an operation S22 of outputting an image that is generated by removing an image aliasing through the first and second interpolation processes S13~S21.

Figure 7:
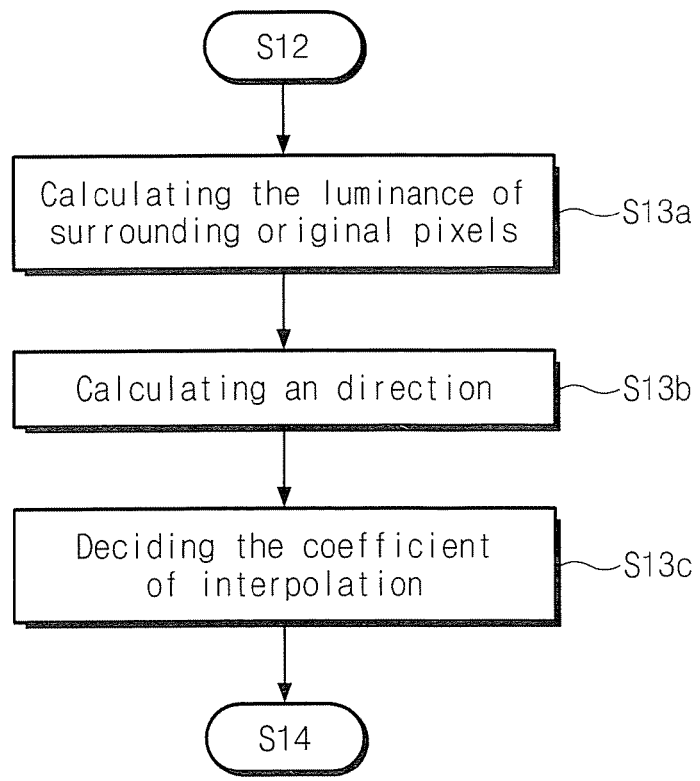
FIG. 7 is a flow chart illustrating operations for detecting an edge for interpolation of a first pixel.

FIG. 7 is a flow chart illustrating operations for detecting an edge in the first interpolation process illustrated in FIG. 6. Referring to FIGS. 4 to 7, first interpolation operations according to some embodiments of the inventive subject matter generate a first interpolated pixel. Edge detection operations of the first interpolation process include an operation S13a of calculating the luminance of surrounding original pixels 0, an operation S13b of calculating a direction, and an operation S13c of determining the coefficient of interpolation. Specifically, the operation S13a calculates the luminance of the original pixels 41~44 surrounding the first interpolated pixel A. The operation S13b calculates the direction of the surrounding original pixels 41~44. The operation S13c determines an interpolation coefficient for calculation of the first interpolated pixel in the operation S14 of FIG. 6, in consideration of the luminance of the original pixels 41~44 calculated in the operation S13a and the direction of the original pixels 41~44 calculated in the operation S13b. The interpolation coefficient determined in the operation S13c is used to apply linear interpolation. The linear interpolation is performed in an operation S14c of FIG. 8.

Figure 8:
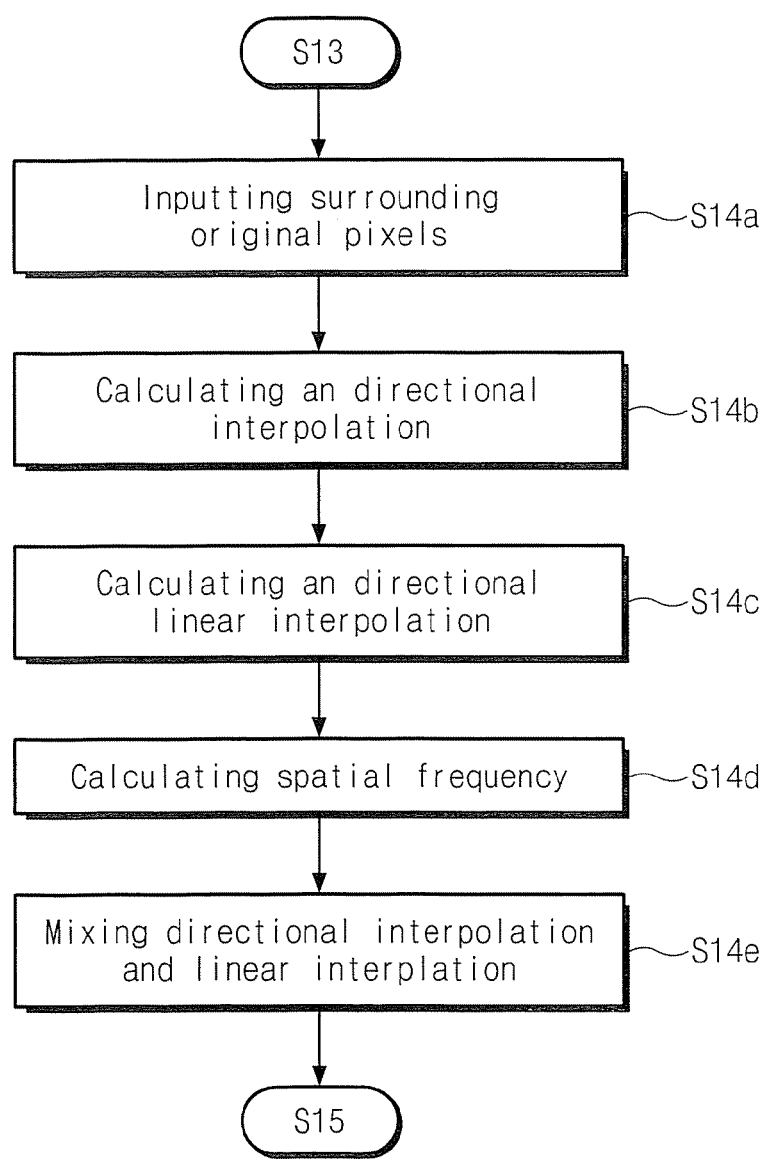
FIG. 8 is a flow chart illustrating operations for interpolation of the first pixel.

FIG. 8 is a flow chart illustrating operations for calculating an interpolated pixel in the first interpolation process illustrated in FIG. 6. Referring to FIGS. 4 and 8, calculation operations include an operation S14a of receiving the surrounding original pixels, an operation S14b of calculating a directional interpolation value, an operation S14c of calculating a linearly interpolated value, an operation S14d of calculating a spatial frequency, and an operation S14e of mixing the directional interpolation value and the linearly interpolated value.

Specifically, the operation S14a receives pixel data (e.g., 8 bits for Red, 8 bits for Green, and 8 bits for Blue) from the surrounding original pixel 0. The operation S14b calculates a directional interpolation value in consideration of the direction of the original pixel calculated in the operation S13b of FIG. 7. In particular, among a plurality of original pixels, the original pixel determining a direction is set to have a high interpolation coefficient (i.e., a weight value).

The operation S14c calculates a linearly interpolated value. Linear interpolation techniques that may be used include, but are not limited to, bi-linear interpolation and bi-cubic interpolation. Bi-linear interpolation uses the same weight value to generate interpolated pixels for original pixels located at a horizontal axis or a vertical axis. Bi-cubic interpolation uses different weight values to generate interpolation values for 4 original pixels located on a diagonal line. In bi-cubic interpolation, a direction is calculated to determine a weight value. Bi-cubic interpolation is exemplified as the linear interpolation according to some embodiments of the inventive subject matter.

The operation S14d calculates a spatial frequency. The spatial frequency represents a variation in image data. In particular, a uniform image represents a low spatial frequency, and a very rough image represents a high spatial frequency. Some embodiments of the inventive subject matter may increase the mixing rate of a directional interpolation value in the event of a high spatial frequency and decrease the mixing rate of a directional interpolation value in the event of a low spatial frequency. The operation S14e generates a first interpolated pixel by using the mixing rate of a direction interpolation value and a linearly interpolated value.

Figure 9:
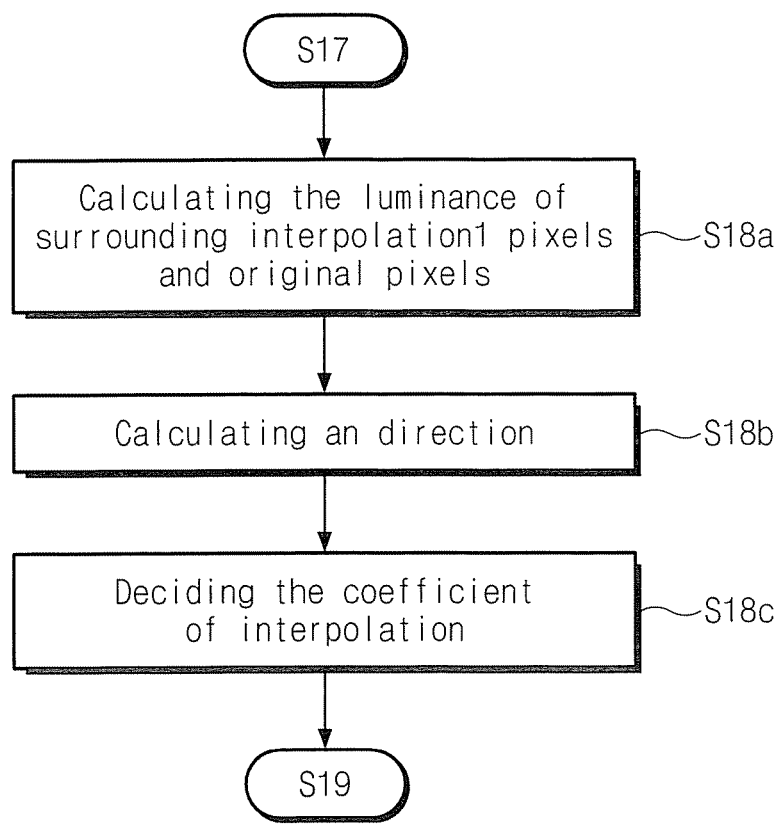
FIG. 9 is a flow chart illustrating operations for detecting an edge for interpolation of a second pixel.

FIG. 9 is a flow chart illustrating operations for detecting an edge in the second interpolation process illustrated in FIG. 6. Referring to FIGS. 5 and 9, edge detection for the second interpolation process includes an operation S18a of calculating the luminance values of the surrounding original pixels 0 and the first interpolated pixel generated in the operation S14, an operation S18b of calculating a direction, and an operation S18c of determining the coefficient of interpolation.

Specifically, the operation S18a calculates the luminance of the original pixels 51~52 surrounding the second interpolated pixel B. The operation S18b calculates the direction of the surrounding original pixels 51~52. The operation S18c determines an interpolation coefficient for calculation of the second interpolated pixel in the operation S19 of FIG. 6, in consideration of the luminance of the original pixels 51~52 calculated in the operation S18a and the direction of the original pixels 51~52 calculated in the operation S18b. The interpolation coefficient determined in the operation 518c is used to apply linear interpolation. The linear interpolation is performed in an operation S19c of FIG. 10.

Figure 10:
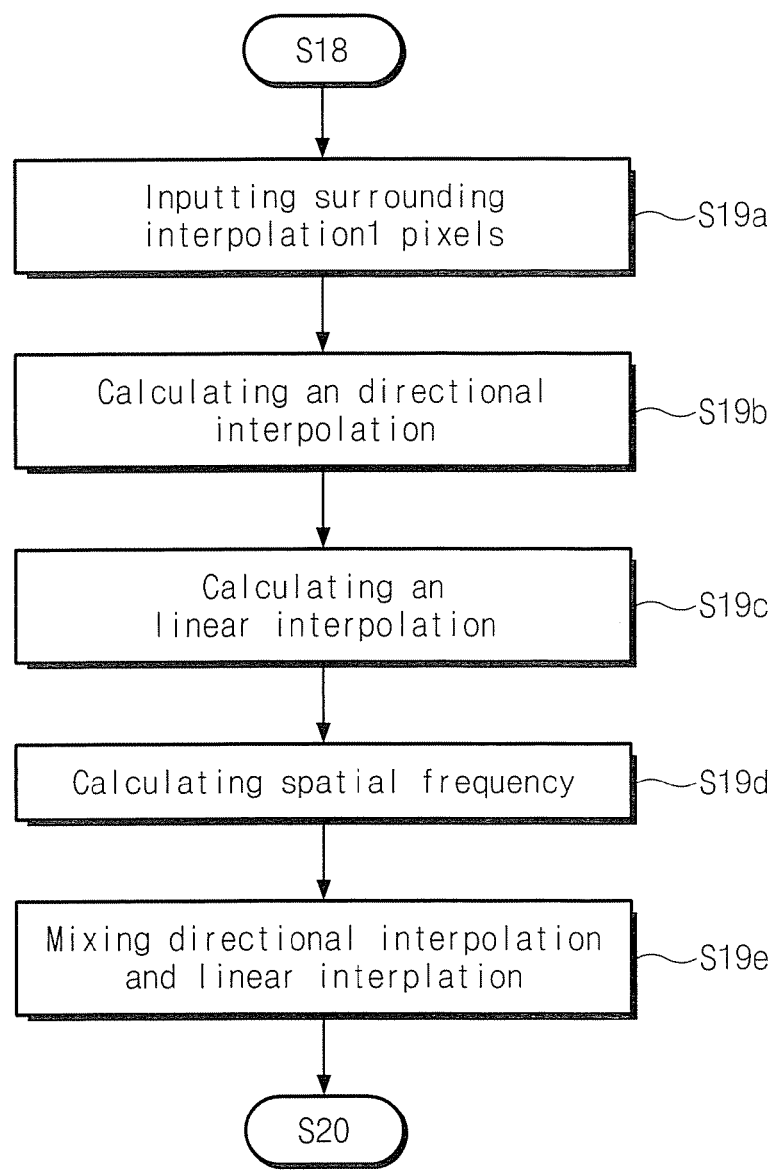
FIG. 10 is a flow chart illustrating operations for interpolation of the second pixel.

FIG. 10 is a flow chart illustrating operations for generating the second interpolated pixel illustrated in FIG. 6. Referring to FIGS. 5 and 10, the operations are similar to those used to generate the first interpolated pixel in FIG. 8. Therefore, detailed description identical operations will be omitted for conciseness.

The second interpolated pixel calculation operations includes an operation 519a of receiving the surrounding first interpolated pixels, an operation 519b of calculating a directional interpolation value, an operation S19c of calculating a linearly interpolated value, an operation S19d of calculating a spatial frequency, and an operation S19e of mixing the directional interpolation value and the linearly interpolated value.

Specifically, the operation 519a receives the surrounding first interpolated pixels. The second interpolated pixel calculation operations use the first interpolated pixel surrounding the second interpolated pixel to be generated.

Figure 11:
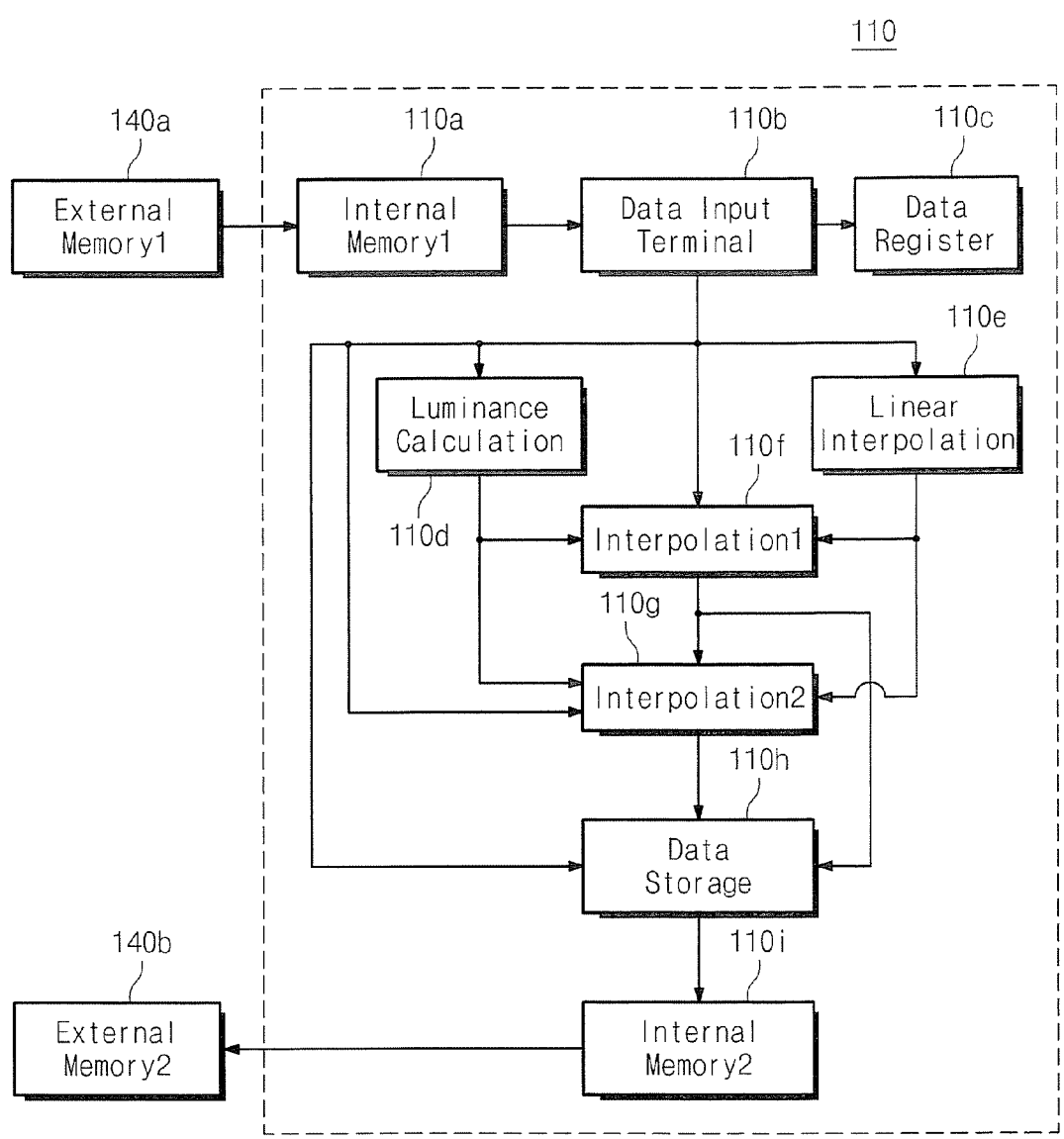
FIG. 11 is a block diagram of a jagging suppression circuit according to further embodiments of the inventive subject matter.

FIG. 11 is a block diagram of a jagging suppression circuit 110 according to further embodiments of the inventive subject matter. The jagging suppression circuit 110 is another example of the jagging suppression circuit 11 illustrated in FIG. 2.

Referring to FIGS. 2 and 11, the jagging suppression circuit 110 includes a first internal memory 110a, a data input terminal 110b, a data register 110c, a luminance calculation circuit 110d, a linear interpolation circuit 1103, a first interpolation circuit 110f, a second interpolation circuit 110g, a data storage circuit 110h, and a second internal memory 110i.

In these embodiments, first and second interpolation processes are performed independently. The first and second interpolation processes will be described later in detail with reference to FIGS. 15 to 17.

The external memory 140 includes a first external memory 140a and a second external memory 140b. In some embodiments, the first external memory 140a stores an image with an original resolution, and the second external memory 140b stores an image with a resolution scaled up by a factor of 2×2 in comparison with the original resolution. The first external memory 140a stores 5 mega pixels (i.e., 5 million pixels). That is, the first external memory 140a stores 2592×1944×24 bits. Image data stored in the first internal memory 110a comprise 2592×1944 pixels.

The data register 110c temporarily stores original pixels from the data input terminal 110b. The data register 110c transmits original pixels, which will be reused, to the data input terminal 110b. Thus, the data register 110c reduces the bandwidth between the first internal memory 110a and the data input terminal 110b. For example, 192 bits may be used as the bandwidth between the first internal memory 110a and the data input terminal 110b.

The image data stored in the first internal memory 110a is comprised of original pixels before resolution scaling-up.

Figure 12:
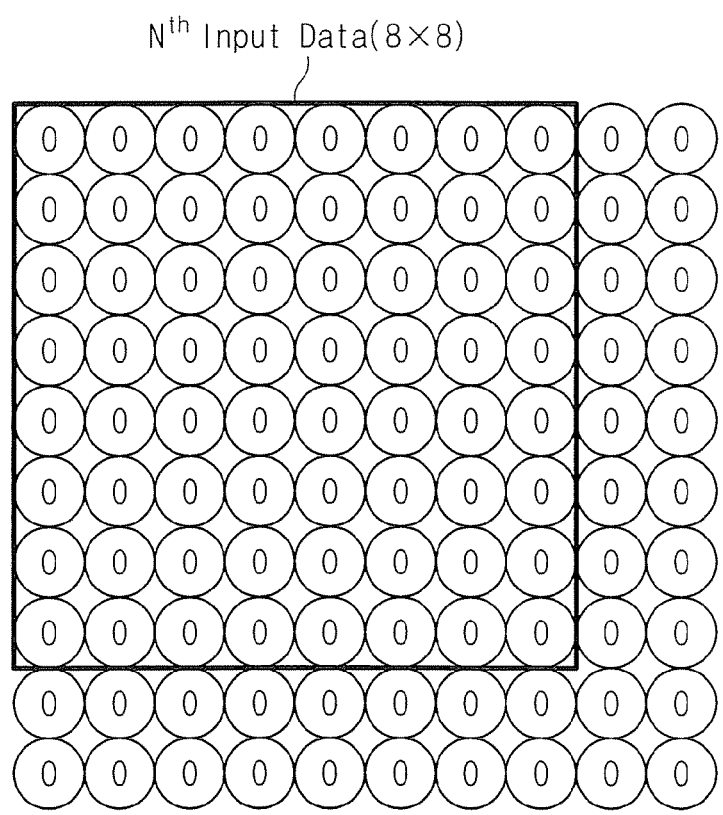
FIGS. 12 and 13 are diagrams illustrating image data that may be input to the jagging suppression circuit of FIG. 11.
Figure 13:
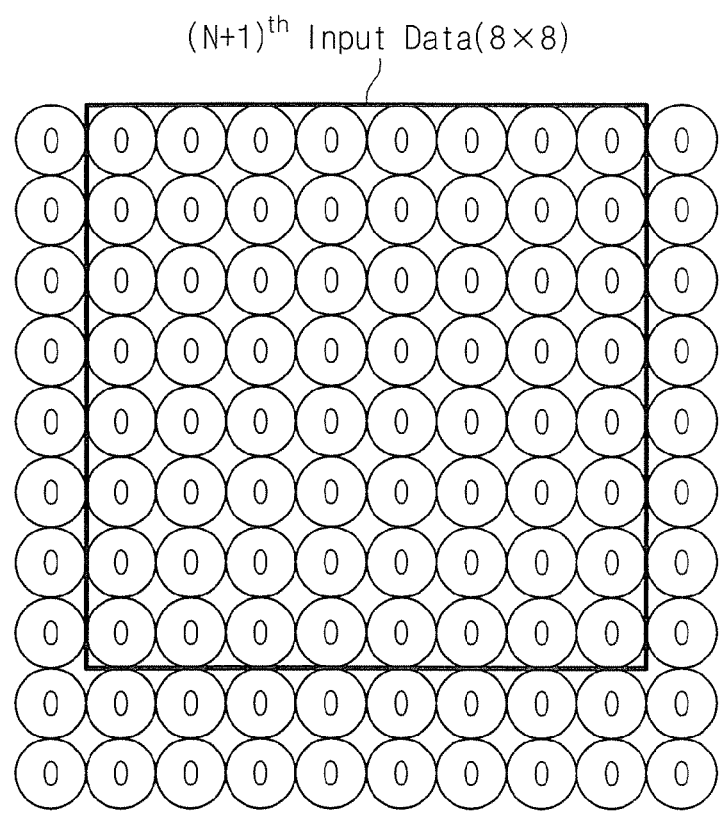

First and second pixel interpolation processes according to further embodiments of the inventive subject matter will now be described. The first internal memory 110a stores 9 lines (i.e., 2592×9 pixels) among image data received from the first external memory 140a. The data input terminal 110b reads 192 (=8×24) bits from the first internal memory 110a and transmits the same to the luminance calculation circuit 110d, the linear interpolation circuit 110e, the first interpolation circuit 110f, the second interpolation circuit 110g, and the data storage circuit 110h. The input data stored at the data input terminal 110b are illustrated in FIGS. 12 and 13.

The luminance calculation circuit 110d calculates the luminance of an original pixel received from the data input terminal 110b. The linear interpolation circuit 110e calculates the linearly interpolated value of the original pixel received from the data input terminal 110b. The first interpolation circuit 110f receives the luminance value from the luminance calculation circuit 110d and the linearly interpolated value from the linear interpolation circuit 110e and generates a first interpolated pixel.

The second interpolation circuit 110g receives the luminance value from the luminance calculation circuit 110d, the linearly interpolated value from the linear interpolation circuit 110e, and the first interpolated pixel from the first interpolation circuit 110f and generates a second interpolated pixel. In particular, the second interpolation circuit 110g reuses the luminance value calculated by the luminance calculation circuit 110d. A process of generating the first and second interpolated pixels by the first and second interpolation circuits 110f and 110g will be described later in detail with reference to FIGS. 15 to 17.

The data storage circuit 110h stores the original pixel and the first and second interpolated pixels. The second internal memory 110i stores the original pixel and the first and second interpolated pixels received from the data storage circuit 110h.

Figure 14:
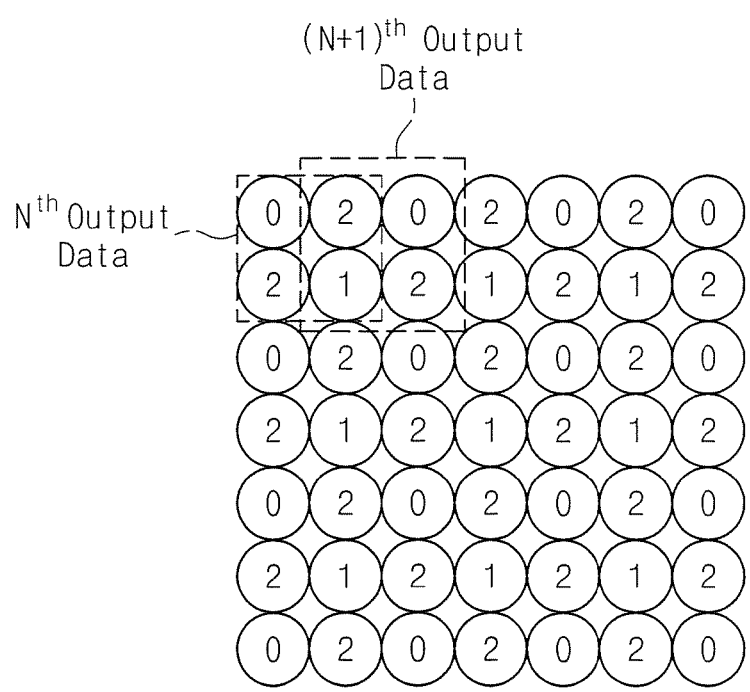
FIG. 14 is a diagram illustrating image data that may be output from the jagging suppression circuit of FIG. 11.

The output data (i.e., the original pixels and the first and second interpolated pixels) stored in the data storage circuit 110h are illustrated in FIG. 14.

The first and second interpolation circuits 110f and 110g repeat the above first and second interpolation processes until the first and second interpolated pixels of FIG. 4 are all generated.

Interpolation operations according to further embodiments of the inventive subject matter perform a second interpolation process after the first interpolation process without increasing the address of the image data. After completion of the second interpolation process, if the current address is not equal to the last address of the image data, the address is increased to repeat the first and second interpolation processes.

Interpolation operations according to further embodiments of the inventive subject matter perform a first interpolation process and a second interpolation process simultaneously. In particular, the first interpolation process and the second interpolation process are performed in a pipelined manner. These interpolation operations will be described later in detail with reference to FIGS. 11 to 17.

FIGS. 12 and 13 are diagrams illustrating the input image data of FIG. 11. FIG. 12 illustrates the $N^{th}$ input data transmitted from the data input terminal 110b of FIG. 11, and FIG. 13 illustrates the $(N+1)^{th}$ input data transmitted from the data input terminal 110b of FIG. 11. The input data may be 8×8 pixel input data.

The data input terminal 110b transmits 8×8 pixel input data to the first and second interpolation circuits 110f and 110g, moving to the right. The data register 110c temporarily stores an overlap between the $N^{th}$ and $(N+1)^{th}$ input data. The data input terminal 110b receives the overlap between the $N^{th}$ and $(N+1)^{th}$ input data from the data resister 110c. Thus, embodiments of the inventive subject matter can reduce the bandwidth for data transmission between the first internal memory 110a and the data input terminal 110b.

FIG. 14 is a diagram illustrating the output image data of FIG. 11. Referring to FIGS. 11 and 14, the output image data include an original pixel, a first interpolated pixel, and two second interpolated pixels. The data storage circuit 110h sequentially receives an original pixel, a first interpolated pixel, and two second interpolated pixels as illustrated in FIG. 14.

Figure 15:
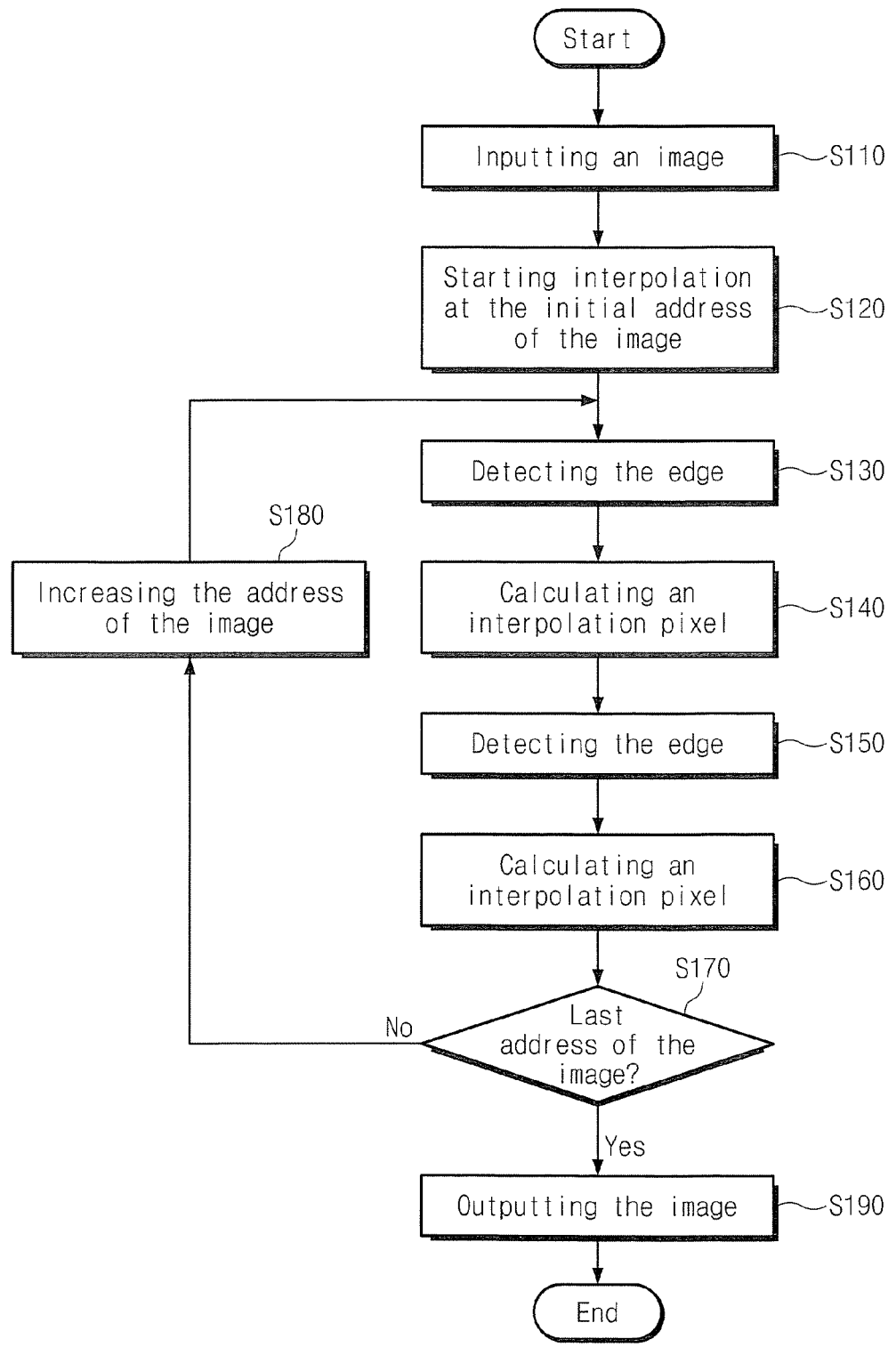
FIG. 15 is a flow chart illustrating interpolation operations according to further embodiments of the inventive subject matter.

FIG. 15 is a flow chart illustrating interpolation operations according to further embodiments of the inventive subject matter. Referring to FIG. 15, the operations include an initialization process (S110~S120), a first interpolation process (S130~S140), a second interpolation process (S150~S180), and an output process (S190).

The initialization process includes an operation S110 of receiving image data and an operation S120 of starting interpolation at the initial address of the image data.

The first interpolation process includes an operation S130 of detecting an edge to determine an edge distribution and an operation S140 of calculating an interpolated pixel.

The second interpolation process includes an operation S150 of detecting an edge to determine an edge distribution, an operation S160 of calculating an interpolated pixel, an operation S170 of determining whether the current address is equal to the last address of the image data, and an operation S180 of increasing the address of the image data if the current address is not equal to the last address of the image data. Herein, if the current address is equal to the last address of the image data, the interpolation operations proceed to the next operation (S190).

The output process includes an operation S190 of outputting an image that is generated by removing an image aliasing through the first and second interpolation processes S130~S180.

The operation S130 of detecting the edge in the first interpolation process will be described later in detail with reference to FIG. 16.

The operation S150 of detecting the edge in the second interpolation process will be described later in detail with reference to FIG. 17.

Figure 16:
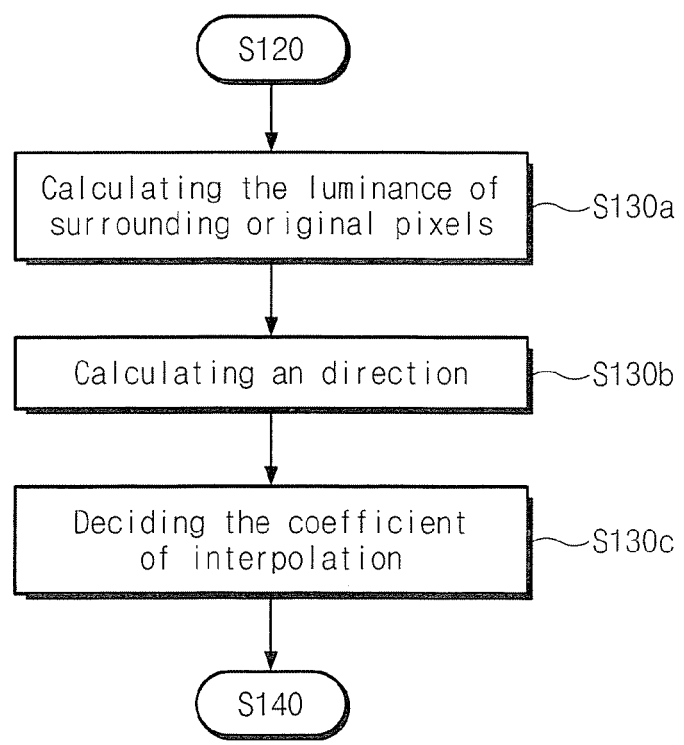
FIG. 16 is a flow chart illustrating operations for detecting an edge in the process illustrated in FIG. 15.

FIG. 16 is a flow chart illustrating operations for detecting an edge in the first interpolation process illustrated in FIG. 15. Referring to FIGS. 14 to 16, edge detection includes an operation S130a of calculating the luminance of surrounding original pixels 0, an operation S130b of calculating a direction, and an operation S130c of determining the coefficient of interpolation.

Figure 17:
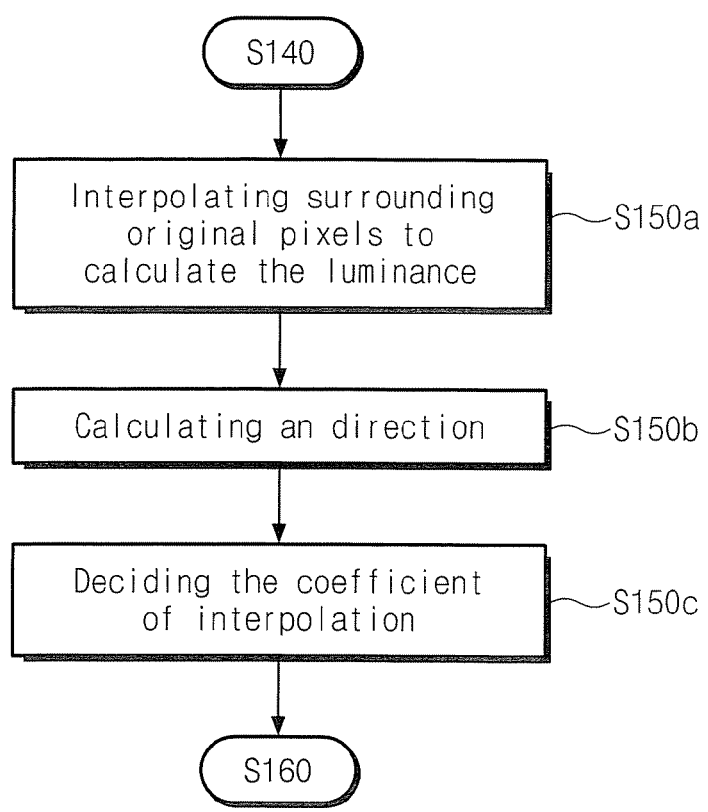
FIG. 17 is a flow chart illustrating operations for interpolation of a pixel in the interpolation process illustrated in FIG. 15.

FIG. 17 is a flow chart illustrating operations for calculating an interpolated pixel in the second interpolation process illustrated in FIG. 15. It is identical to the second interpolation operations described above, except for an operation of interpolating surrounding original pixels to calculate a luminance value S150a.

Referring to FIGS. 14 to 17, interpolated pixel calculation operations include an operation S150a of interpolating the surrounding original pixels to calculate a luminance value, an operation S150b of calculating a direction, and an operation S150c of determining the coefficient of interpolation. Specifically, the operation S150a interpolates the original pixels surrounding the second interpolated pixel to calculate a luminance value. The second interpolation operations interpolate the surrounding original pixels to calculate the luminance value, without using the first interpolated pixel. That is, further embodiments of the inventive subject matter reuse the luminance value that is generated in the first interpolation process.

As described above, some embodiments of the inventive subject matter make it possible to reduce aliasing of an image with a scaled-up resolution.

The above-disclosed subject matter is to be considered illustrative and not restrictive, and the appended claims are intended to cover all such modifications, enhancements, and other embodiments, which fall within the true spirit and scope of the inventive subject matter. Thus, to the maximum extent allowed by law, the scope of the inventive subject matter is to be determined by the broadest permissible interpretation of the following claims and their equivalents, and shall not be restricted or limited by the foregoing detailed description.

What is claimed is:

1. An image processing method comprising:
    generating image data for an image, the image data comprising an array of original pixels;
    interpolating respective first pixels for the image from respective pluralities of original pixels adjacent the interpolated first pixels; and
    interpolating respective second pixels for the image from respective pluralities of original pixels adjacent the interpolated second pixels using image information generated in the interpolation of the interpolated first pixels.

2. The method of claim 1, wherein interpolating respective first pixels for the image from respective pluralities of original pixels adjacent the interpolated first pixels comprises:
    detecting an edge from the original pixels adjacent the first interpolated pixel;
    generating a directional interpolation coefficient responsive to detection of the edge;
    generating a directional interpolation value from the directional interpolation coefficient;
    linearly interpolating a value of the adjacent original pixels;
    calculating a spatial frequency of the adjacent original pixel; and
    combining the directional interpolation value and the linearly interpolated value based on the calculated spatial frequency to generate an interpolated first pixel.

3. The method of claim 2, wherein linearly interpolating a value of the adjacent original pixels comprises using bi-linear and/or bi-cubic interpolation.

4. The method of claim 2, wherein combining the directional interpolation value and the linearly interpolated value comprises:
    determining a weight value of the directional interpolation value according to the calculated spatial frequency; and
    combining the directional interpolation value and the linearly interpolated value based on the determined weight value to generate a first interpolated pixel.

5. The method of claim 4, wherein determining a weight value of the directional interpolation value according to the calculated spatial frequency comprises assigning a first weight value to the directional interpolation value if the calculated spatial frequency is greater than a predetermined value or assigning a second weight value less than the first weight value to the directional interpolation value if the calculated spatial frequency is less than the predetermined value.

6. The method of claim 4, wherein generating a directional interpolation coefficient comprises:
    calculating a luminance value from the adjacent original pixels;
    calculating a direction based on the calculated luminance value; and
    generating the directional interpolation coefficient based on the calculated direction.

7. The method of claim 1, wherein interpolating respective second pixels comprises interpolating the second pixels after interpolating first pixels for the entire image.

8. The method of claim 1, wherein interpolating respective second pixels comprises interpolating the second pixels from adjacent original pixels and the interpolated first pixels.

9. The method of claim 1, wherein interpolating respective second pixels comprises interpolating the second pixels from adjacent original pixels and luminance information generated in interpolating the first pixels.

10. An apparatus comprising a computer configured to perform the method of claim 1.

11. A non-transitory computer-readable medium having computer program code embodied therein, the computer program code configured to perform the method of claim 1.

* * * * *